United States Patent [19]
Ito et al.

[11] Patent Number: 6,125,981
[45] Date of Patent: Oct. 3, 2000

[54] TEMPERATURE SENSITIVE FLUID TYPE FAN COUPLING APPARATUS

[75] Inventors: Haruyasu Ito, Fuji; Yoshinobu Iida, Shizuoka Prefecture, both of Japan

[73] Assignee: Usui Kokusai Sangyo Kaisha Limited, Japan

[21] Appl. No.: 09/332,666

[22] Filed: Jun. 14, 1999

[30] Foreign Application Priority Data

Jun. 17, 1998 [JP] Japan .................................. 10186911

[51] Int. Cl.$^7$ .................................................. F16D 35/02
[52] U.S. Cl. ................................ 192/58.61; 192/58.681; 192/58.682; 192/82 T
[58] Field of Search ................................ 192/58.5, 58.6, 192/58.61, 58.681, 58.682, 58.8, 82 T

[56] References Cited

U.S. PATENT DOCUMENTS

| | | |
|---|---|---|
| 2,879,755 | 3/1959 | Weir . |
| 2,988,188 | 6/1961 | Tauschek . |
| 3,059,745 | 10/1962 | Tauschek . |
| 3,217,849 | 11/1965 | Weir . |
| 3,259,221 | 7/1966 | Godfrey . |
| 3,272,188 | 9/1966 | Sabat . |
| 3,430,743 | 3/1969 | Fujita et al. . |
| 3,463,282 | 8/1969 | Fujita et al. . |
| 3,642,105 | 2/1972 | Kikuchi . |
| 3,727,735 | 4/1973 | La Flame . |
| 3,840,101 | 10/1974 | Peter et al. . |
| 3,856,122 | 12/1974 | Leichliter . |
| 3,893,555 | 7/1975 | Elmer . |
| 3,964,582 | 6/1976 | Mitchell . |
| 4,238,016 | 12/1980 | Yoshida et al. . |
| 4,281,750 | 8/1981 | Clancey . |
| 4,312,433 | 1/1982 | Bopp .............................. 192/58.682 X |
| 4,403,684 | 9/1983 | Haeck . |
| 4,505,367 | 3/1985 | Martin . |
| 4,629,046 | 12/1986 | Martin . |
| 4,665,694 | 5/1987 | Brunken . |
| 4,667,791 | 5/1987 | Martin et al. . |
| 4,685,549 | 8/1987 | Brunken et al. . |
| 4,699,258 | 10/1987 | Johnston et al. . |

(List continued on next page.)

FOREIGN PATENT DOCUMENTS

| | | |
|---|---|---|
| 54-25581 | 8/1979 | Japan . |
| 55-76226 | 6/1980 | Japan . |
| 57-1829 | 1/1982 | Japan . |
| 57-167533 | 10/1982 | Japan . |
| 57-179431 | 11/1982 | Japan . |
| 59-27452 | 7/1984 | Japan . |
| 62-124330 | 6/1987 | Japan . |
| 62-194038 | 8/1987 | Japan . |
| 63-21048 | 5/1988 | Japan . |
| 63-182332 | 11/1988 | Japan . |

*Primary Examiner*—Richard M. Lorence
*Attorney, Agent, or Firm*—Anthony J. Casella; Gerald E. Hespos; Michael J. Porco

[57] ABSTRACT

A temperature sensitive fluid type fan coupling apparatus is provided which can prevent "an accompanying rotation" phenomenon from being generated so as to reduce fan sound and improve fuel consumption. The fan coupling apparatus comprises a sealing device box including a cover and a case which is separated into an oil reserving chamber and a torque transmission chamber by a partition plate. A drive disc is fixed to a rotary shaft body and is disposed inside the torque transmission chamber to support the sealing device box. A circulating flow passage delivers oil from the torque transmission chamber to the oil reserving chamber. A valve member for opening and closing a supply hole communicating between the torque transmission chamber and the oil reserving chamber is provided so as to increase and reduce an effective contact area for the oil in the drive disc and torque transmission gap portion, thereby controlling a torque transmission to the side of the sealing device box driven by the rotary shaft body. Barrages for holding the oil, in the oil reserving chamber and not the torque transmission chamber, are provided on both sides of the supply hole, thereby preventing the "accompanying rotation" phenomenon in the driven side of the sealing device box due to the excessive oil.

15 Claims, 9 Drawing Sheets

U.S. PATENT DOCUMENTS

| | | | |
|---|---|---|---|
| 4,796,571 | 1/1989 | Ono et al. | |
| 4,846,331 | 7/1989 | Ono | |
| 4,850,465 | 7/1989 | Ono | |
| 4,903,643 | 2/1990 | Takikawa et al. | |
| 4,903,805 | 2/1990 | Ono | |
| 4,930,458 | 6/1990 | Takikawa et al. | |
| 4,995,494 | 2/1991 | Kennedy et al. | 192/58.8 |
| 5,004,085 | 4/1991 | Taureg | |
| 5,018,612 | 5/1991 | Takikawa et al. | |
| 5,060,774 | 10/1991 | Takikawa et al. | |
| 5,090,533 | 2/1992 | Inoue | |
| 5,101,949 | 4/1992 | Takikawa et al. | |
| 5,109,965 | 5/1992 | Inoue | |
| 5,119,920 | 6/1992 | Inoue | |
| 5,125,491 | 6/1992 | Takikawa et al. | |
| 5,139,125 | 8/1992 | Takikawa et al. | |
| 5,232,074 | 8/1993 | Watanabe | |
| 5,452,782 | 9/1995 | Inoue | |
| 5,484,045 | 1/1996 | Kikuchi et al. | 192/58.4 |
| 5,501,183 | 3/1996 | Takayama | |
| 5,575,368 | 11/1996 | Kikuchi et al. | |
| 5,794,749 | 8/1998 | Ryuu | |
| 5,881,857 | 3/1999 | Ryuu | |

TEMPERATURE SENSITIVE FLUID TYPE FAN COUPLING APPARATUS

BACKGROUND OF THE INVENTION

1. Field of the Invention

The invention relates to a temperature sensitive fluid type fan coupling apparatus which generally controls a rotation of a fan for cooling an engine in an automotive vehicle so as to always supply an amount of cooling air blast to the engine in correspondence to a traveling state.

2. Description of the Prior Arts

As this kind of conventional fan coupling apparatus, a system of transmitting a drive torque of a drive disc to a sealing device box by an oil supplied to a torque transmission chamber is popular, and as a structure thereof, there has been known, for example, a temperature sensitive fluid type fan coupling apparatus structured such that an inner portion of the sealing device box is separated into the torque transmission chamber and an oil reserving chamber by a partition plate, the drive disc is provided within the torque transmission chamber by a drive operation of the drive portion, the oil in the oil reserving chamber is supplied to the torque transmission chamber from a supply hole formed in the partition plate or a cover, and the oil in the torque transmission chamber is returned to the oil reserving chamber by a circulation passage (refer to Japanese Patent Examined Publication No. 63-21048). In accordance with this kind of fan coupling apparatus, the drive torque of the drive disc is transmitted to the sealing device box by the oil supplied to the torque transmission chamber from the oil reserving chamber, and a cooling fan mounted to the sealing device box is rotated, so that, for example, the engine for the automotive vehicle is cooled. Further, this kind of fan coupling apparatus is structured such as to detect a temperature of an atmosphere by a bimetal and increase an opening degree of the supply hole when the temperature increases, or directly operate a valve member by a solenoid valve or indirectly operate the valve member by an electromagnet, thereby increasing an amount of the oil within the torque transmission chamber by increasing the opening degree of the supply hole, increasing a number of rotation of the sealing device box and rotating the cooling fan at a high speed so as to increase a cooling effect.

However, this kind of fan coupling apparatus has problems mentioned below.

That is, when restarting the engine in a state that a large amount of oil exists within the torque transmission chamber or when rapidly accelerating during a travel, the sealing device box (the cooling fan) in a driven side causes a rapid increase of the rotation only for a short time by a large amount of oil existing within the torque transmission chamber in correspondence to the acceleration of the drive disc in a drive side. This phenomenon is generally called as "an accompanying rotation", generates a fan sound and an inconvenient feeling together with the sound, absorbs an engine output and deteriorates a specific fuel consumption.

As means for solving the "accompanying rotation" phenomenon mentioned above, there have been known, for example, a structure made such as to temporarily introduce an oil flowing out from a supply hole in a partition plate to a side opposite to a diametrical direction and supply to an inner portion of the torque transmission chamber therefrom (refer to Japanese Patent Examined Publication No. 63-21048), a structure in which a sub oil reserving chamber is provided by forming a drive disc in a hollow structure, and a system of driving a fan having a large blowing capacity at a low speed rotation.

However, these means have disadvantages mentioned below.

That is, in the structure structured such as to temporarily introduce the oil flowing out from the supply hole in the partition plate to the side opposite to the diametrical direction and supplying to the inner portion of the torque transmission chamber therefrom, since the oil does not flow into the torque transmission chamber from the oil reserving chamber in the case that the engine stops when the oil hardly exists within the torque transmission chamber and a large amount of oil exists within the oil reserving chamber, the "accompanying rotation" phenomenon is not generated when the engine is restarted. However, it is not effective for preventing the "accompanying rotation" phenomenon at a time of restarting in the case that the engine is stopped in a state that a large amount of oil exists within the torque transmission chamber or at a time of rapidly accelerating during the travel. Further, in the method in which the sub oil reserving chamber is provided, there is a problem that it is indispensable to complicate the structure, so that a cost becomes high, and in addition, and a mounting is limited since a size in an axial direction is excessively required. Still further, in the system of rotating the fan having a great blowing capacity at a low speed, since a fan coupling apparatus having a high radiating performance is required since the cooling fan is enlarged, and it is unavoidable to make the fan coupling apparatus in a large size, a cost increase, an increase of a horse power for driving (a reduction of a specific fuel consumption) and a limitation of a mounting are caused, so that it is not preferable.

SUMMARY OF THE INVENTION

The invention is made by solving the problem in the prior art mentioned above, and an object of the invention is to provide a temperature sensitive fluid type fan coupling apparatus which can prevent "an accompanying rotation" phenomenon from generating by significantly simple means so as to reduce a fan sound and improve a specific fuel consumption.

In accordance with the invention, there is provided a temperature sensitive fluid type fan coupling apparatus structured such that an inner portion of a sealing device box comprising a cover and a case supported on a rotary shaft body adhering a drive disc to a front end portion via a bearing and mounting a cooling fan on an outer peripheral portion is separated into an oil reserving chamber and a torque transmission chamber installing the drive disc therein by a partition plate so as to form a dam and a circulating current passage communicating with a side of the oil reserving chamber from a side of the torque transmission chamber connecting to the dam on a part of an inner peripheral wall surface in a side of the sealing device box opposing to an outer peripheral wall portion of the drive disc in which the oil is collected and reserved at a time of rotation, and a valve member for opening and closing a supply hole operated by an actuator provided in an outer portion of the cover and communicating with the side of the torque transmission chamber from the side of the oil reserving chamber is provided in an inner portion thereof so as to increase and reduce an effective contact area for the oil at a torque transmission gap portion provided in an opposing wall surface near an outer portion of the drive disc, the case and cover, thereby controlling a torque transmission to the side of the sealing device box in the driven side from the side of the rotary shaft body, wherein a pair of barrages are provided in both sides of the supply hole in such a manner as to be closely attached to both of the inner wall of the oil reserving chamber and the partition plate . Further, the barrages may be integrally structured with the cover, and further, it is preferable that inlet restriction means for an excessive oil is provided in the barrages.

Further, in the case of the temperature sensitive fluid type fan coupling apparatus structured such that the inner portion of the sealing device box is separated into the torque transmission chamber and the oil reserving chamber by the partition plate, the drive disc is provided within the torque transmission chamber in such a manner as to freely rotate by a drive of the drive portion, the oil in the oil reserving chamber is supplied to the torque transmission chamber from the supply hole formed in the partition plate or the cover and the oil in the torque transmission chamber is returned to the oil reserving chamber by the circulating passage, at the beginning when the fan coupling apparatus is in an ON state, a supply amount of the oil to the torque transmission chamber from the oil reserving chamber is more than a recovery amount of the oil from the torque transmission chamber by the dam, so that the oil in the oil reserving chamber is supplied and discharged to the torque transmission chamber together with a lapse of a time except a minimum amount and is balanced. All of the oil recovered at this time is supplied to the side of the torque transmission chamber and the amount of the recovered oil and the amount of the supplied oil are equal to each other, however, the oil discharged from the oil reserving chamber can flow into the torque transmission gap portion only at a capacity of the torque transmission gap portion in the torque transmission chamber and stays in a space portion in front of the torque transmission gap portion.

Then, the oil in the torque transmission gap portion is recovered by the dam at a time of starting or acceleration, however, the oil stored in the space portion subsequently flows into the torque transmission gap portion so as to generate the "accompanying rotation". On the contrary, the stored oil becomes an excessive oil since it is over a minimum amount necessary for operating the fan coupling apparatus, however, the oil is necessary for securing a durability of an oil and absorbing an error on manufacturing.

The invention holds the excessive oil within the oil reserving chamber not in the space portion in front of the torque transmission gap portion within the torque transmission chamber, thereby intending to prevent the "accompanying rotation" phenomenon in the side of the sealing device box by preventing the oil from flowing to the torque transmission gap from the space portion when the oil in the torque transmission gap portion is recovered at a time of starting or acceleration. Accordingly, as the means therefor, a pair of barrages are provided in both sides of the supply hole pierced on the partition plate or the cover in such a manner as to be closely attached to both of the inner wall of the oil reserving chamber and the partition plate.

A pair of barrages in the invention are constituted by substantially plate-like members and are provided in both sides of the supply hole pierced on the partition plate or the cover in such a manner as to be positioned in a peripheral direction of the rotary shaft body. The barrages are closely attached to both of the inner wall of the oil reserving chamber and the partition plate, and are formed as a part of the oil reserving chamber. Accordingly, the barrages serve so as to feed the oil to the portion near the supply hole only at a necessary amount, and to reserve the oil except that in the oil reserving chamber.

In this case, as the actuator for the valve member, it is possible to use a plate-like bimetal formed in a short strip or a spiral shape, a solenoid valve or an electromagnet. In the case of the bimetal formed in a short strip, the plate-like valve member fixes a base end portion thereof to the partition plate and has a free end in such a manner as to be in contact with or apart from the peripheral edge portion of the supply hole, thereby moving the bimetal formed in a short strip and the valve member in an interlocking manner by a connecting rod. Further, in the case of the spiral-shaped bimetal, the plate-like valve member is provided in such a manner as to be rotatably in contact with the surface of the partition plate in the side of the oil reserving chamber or the torque transmission chamber or the peripheral wall surface of the oil reserving chamber without fixing the plate-like valve member to the partition plate by interlocking the spiral-shaped bimetal, the valve member and the connecting rod.

Further, in the case of the solenoid valve, the plate-like valve member fixes a base end portion thereof to the partition plate and has a free end in such a manner as to be in contact with or apart from the peripheral edge portion of the supply hole, and mounts a free end of a piston rod in the solenoid valve to the valve member so as to operate the solenoid valve on the basis of the signals sensed by the temperature sensor and the throttle opening degree sensor, thereby directly operating the valve member via the piston rod.

Still further, in the case of the electromagnet, the plate-like valve member fixes a base end portion thereof to the partition wall, and energizes an electromagnet provided in such a manner as to oppose to the valve member at a slight interval from the sealing device box in an axial direction on the basis of the signals sensed by the temperature sensor and the throttle opening sensor so as to magnetically suck the valve member, thereby indirectly operating the valve member.

In the present invention, since it is possible to hold the oil which is necessary for securing a durability of the oil and absorbing the error on manufacture, however, is excessive with respect to a countermeasure for the "accompanying rotation", within the oil reserving chamber not in the space portion in front of the torque transmission gap portion within the torque transmission chamber due to the operation of a pair of barrages provided in the oil reserving chamber in the manner mentioned above, it is possible to prevent the "accompanying rotation" phenomenon in the side of the sealing device box caused by the excessive oil.

Further, in accordance with the invention, since a notch, an orifice, a wall portion extending in a peripheral direction or a step portion is provided in an inner free end of the barrage so as to form restriction means for restricting an inlet of the excessive oil, the oil recovered in the oil reserving chamber can reach the supply hole only by passing through the notch or the orifice, so that a lot of time is required for this passing and an amount thereof is a little. Accordingly, an inlet of the oil to the torque transmission gap portion is delayed and an amount of the oil is a little, so that it is structured such that the "accompanying rotation" phenomenon can be more effectively prevented.

Accordingly, in accordance with the invention, it is possible to prevent the "accompanying rotation" phenomenon in the side of the sealing device box not only when the engine is restarted but also when a sudden acceleration is performed during an operation, so that it is possible to transmit a torque to the sealing device box from the drive disc in an optimum state in correspondence to various kinds of drive conditions by means of the valve member which is operated in response to the ambient air temperature as well as a reduction of the fan sound, a reduction of the absorbed horse power and an improvement of the specific fuel consumption c an be achieved. Further, the oil heated by being sheared by the drive disc within the torque transmission chamber stays within the oil reserving chamber which is disposed in the front surface side and easily cooled by a radiator passing air, thereby being cooled more, so that a durability of the oil can be improved.

BRIEF DESCRIPTION OF THE DRAWINGS

FIGS. 3A and 3B are views which show a modified embodiment of the barrage provided in the oil reserving chamber of the fan coupling apparatus mentioned above, in which

FIGS. 6A and 6B are views which show a modified embodiment of the barrage provided in the oil reserving chamber of the fan coupling apparatus mentioned above, in which

FIGS. 10A and 10B are views which show the other embodiment of a barrage in accordance with the invention, in which

FIGS. 11A and 11B are views which show further the other embodiment of a barrage in accordance with the invention, in which

FIGS. 12A and 12B are views which show further the other embodiment of a barrage in accordance with the invention, in which

FIGS. 13A and 13B are views which show further the other embodiment of a barrage in accordance with the invention, in which FIGS. 14A and 14B are views which show further the other embodiment of a barrage in accordance with the invention, in which

DETAILED DESCRIPTION OF THE PREFERRED EMBODIMENTS

In the drawings, reference numeral 1 denotes a rotary shaft body forming a drive side, reference numeral 2 denotes a sealing device box, reference numeral 3 denotes a torque transmission chamber, reference numeral 3-1 denotes a torque transmission gap portion, reference numeral 3-2 denotes a torque transmission gap portion front side space portion, reference numeral 4 denotes a partition plate, reference numeral 5 denotes an oil reserving chamber, reference numeral 6 denotes a drive disc, reference numerals 7-1 and 7-2 denote a valve member, reference numerals 8-1 and 8-2 denote a connecting rod, reference numeral 8-3 denotes a piston rod, reference numeral 9-1 denotes a bimetal formed in a short strap, reference numeral 9-2 denotes a spiral bimetal, reference numeral 9-3 denotes a solenoid valve, reference numeral 9-4 denotes an electromagnet, reference numerals 10-1 and 10-2 denote a supply hole, reference numeral 11 denotes a dam, reference numeral 12 denotes a support metal fitting, reference numeral 13 denotes a circulating flow passage, reference numeral 14 denotes a circular through hole, reference numeral 15 denotes a barrage, reference numeral 16 denotes a support metal fitting, reference numeral 17 denotes a bracket, reference numeral 18 denotes a magnetic body piece, and reference numeral 19 denotes a bearing.

Figure 1:
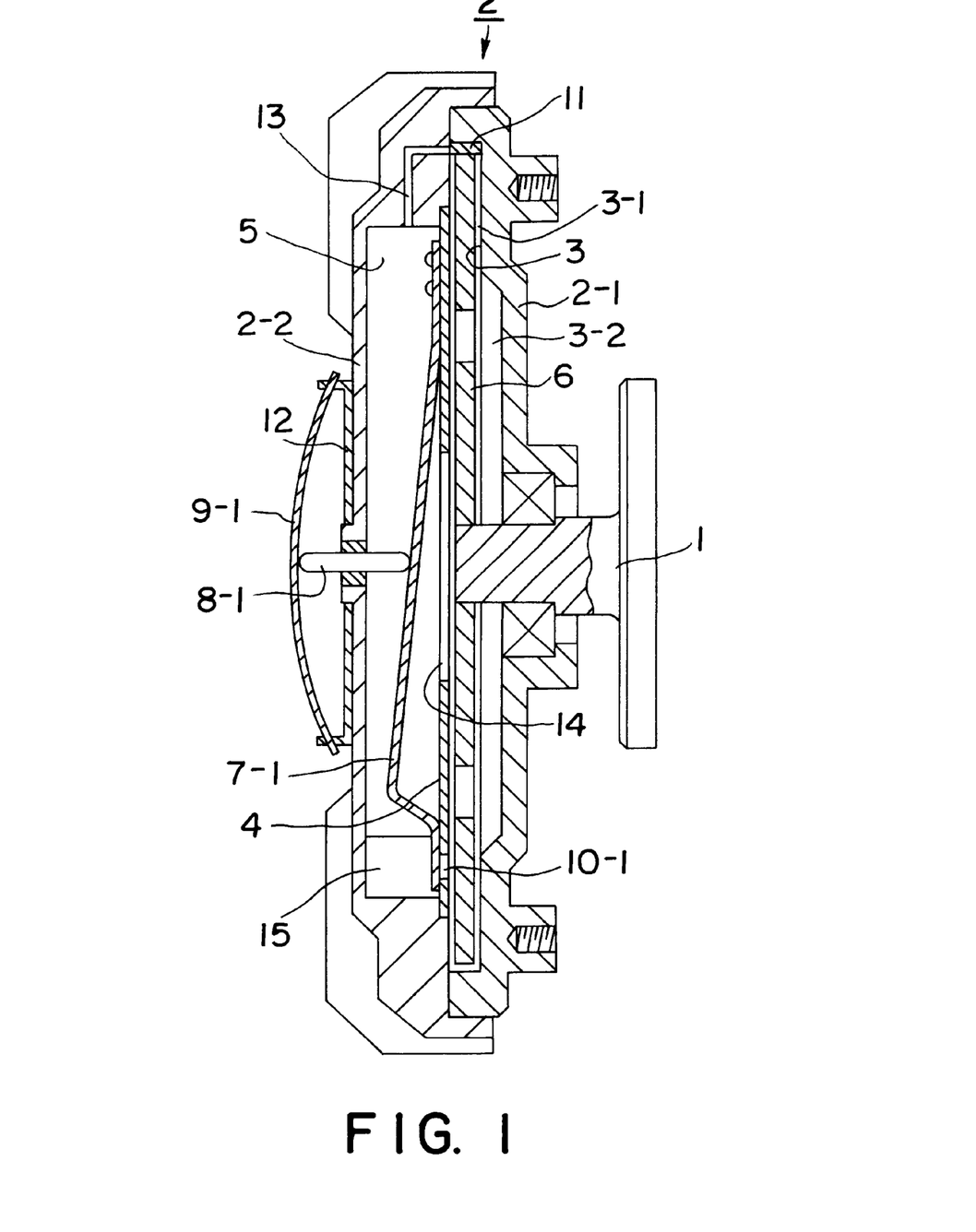
FIG. 1 is a vertical cross sectional side view which shows an embodiment of a temperature sensitive fan coupling apparatus in accordance with the invention.

A temperature sensitive fan coupling apparatus shown in FIG. 1 is structured such that the sealing device box 2 having a large diameter and a short length is rotatably mounted to the rotary shaft body 1 which rotates by being driven by a drive portion (not shown) via the bearing. The sealing device box 2 is constituted by a case 2-1 and a cover 2-2, an inner portion is separated into the torque transmission chamber 3 and the oil reserving chamber 5 by the partition plate 4, and the disc-like drive disc 6 fixed to an end portion of the rotary shaft body 1 is received within the torque transmission chamber 3 in such a manner that the torque transmission gap portion 3-1 and the torque transmission gap portion front space portion 3-2 are formed with respect to the inner peripheral surface of the torque transmission chamber 3. The supply hole 10-1 for supplying an oil from the oil reserving chamber 5 to the torque transmission chamber 3 is provided in the partition plate 4. The valve member 7-1 having a spring characteristic and opening and closing the supply hole 10-1 is structured such that an end thereof is riveted to a wall surface of the partition plate 4 in the side of the oil reserving chamber 5 and the other end is positioned at the supply hole 10-1 portion, and is provided in the inner portion via the connecting rod 8-1 in such a manner as to interlock with a deformation caused by a temperature change in an outer peripheral portion by means of the bimetal formed in a short strap 9-1 as an actuator having both ends locked to the support metal fitting 12 fixed to the front surface of the cover 2-2.

On the contrary, the dam 11 is provided in a part of an inner peripheral wall surface of the sealing device box 2 opposing to an outer peripheral wall portion of the drive disc 6 in which an oil is collected and stored at a time of rotation, thereby forming the circulating flow passage 13 from the side of the torque transmission chamber 3 connecting a portion in front of the dam 11 in the rotational direction to the oil reserving chamber 5 so as to have a pumping function. Reference numeral 14 denotes a circular through hole provided in a center of the partition plate 4.

Figure 2:
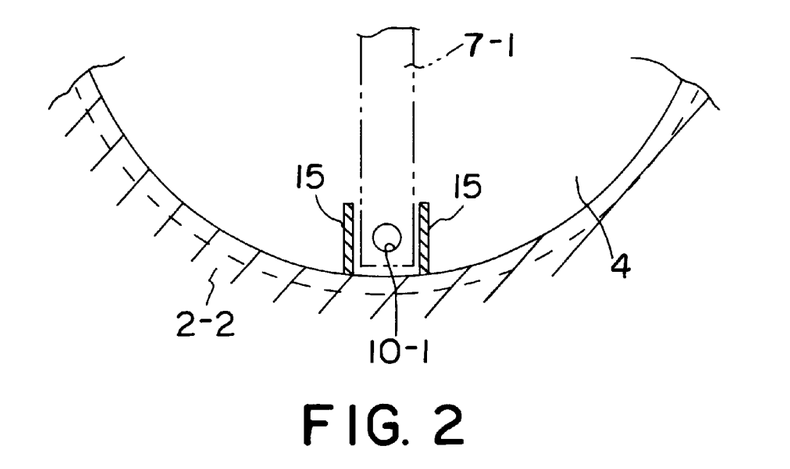
FIG. 2 is a vertical cross sectional front view which shows a portion of barrages provided in an oil reserving chamber of the fan coupling apparatus mentioned above.
Figure 3A:
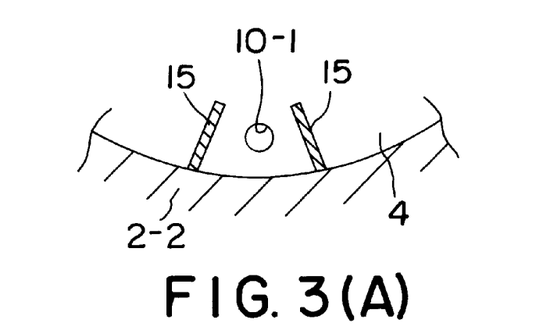
FIG. 3A is a vertical cross sectional front view showing barrages formed in a tapered shape and FIG. 3B is a vertical cross sectional front view showing barrages integrally formed with a cover.
Figure 3B:
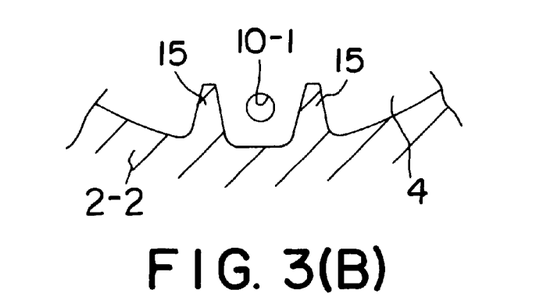

The invention is structured such that in the fan coupling apparatus having the structure mentioned above, a pair of barrages 15 are provided in a diametrical direction in both sides of the supply hole 10-1 disposed in the partition plate 4 and at a position of the rotary shaft body 1 in a peripheral direction in such a manner as to closely attach to both of the inner peripheral wall of the oil reserving chamber 5 and the partition plate 4, and more preferably, are integrally formed with the inner peripheral wall and formed as a part of the oil reserving chamber. The barrages 15 are normally provided in parallel to each other as shown in FIG. 2, however, may be provided in such a manner as to form a tapered shape as shown in FIG. 3A or integrally provided with the cover as shown in FIG. 3B.

As mentioned above, in the case that a pair of barrages 15 are provided in a diametrical direction in both sides of the supply hole 10-1 disposed in the partition plate 4 in such a manner as to closely attach to both of the inner peripheral wall of the oil reserving chamber 5 and the partition plate 4, the barrages flow a necessary amount of oil within the oil reserving chamber 5 to a portion near the supply hole 10-1 and store the oil except that in the oil reserving chamber 5, whereby the oil which is necessary for securing a durability of the oil and absorbing an error on manufacture and excessive for the "accompanying rotation" can be held within the oil reserving chamber 5 not in the space portion 3-2 in front of the torque transmission gap portion 3-1 within the torque transmission chamber 3, so that it is possible to prevent the "accompanying rotation" phenomenon in the side of the sealing device box 2 due to the excessive oil.

Figure 4:
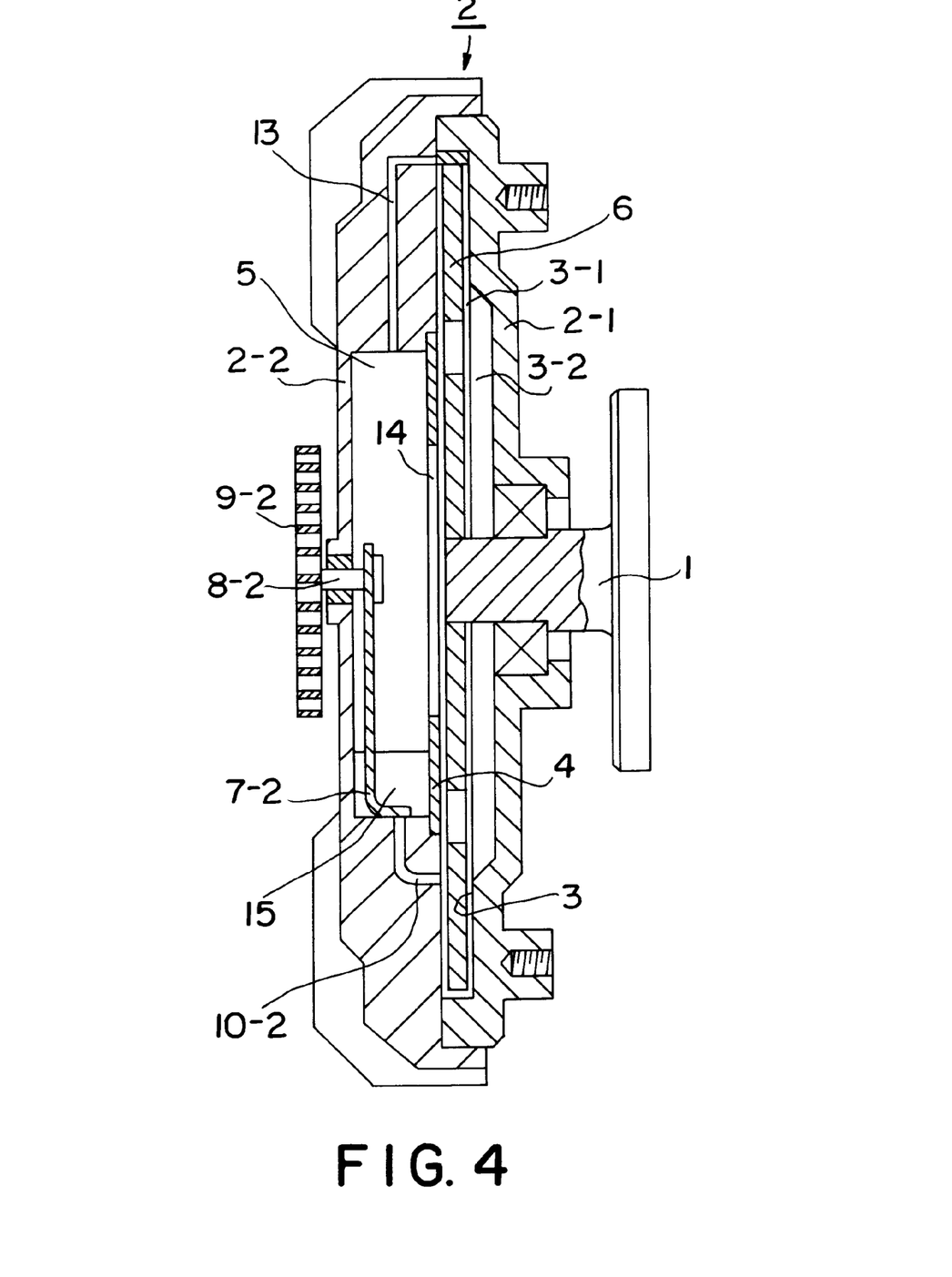
FIG. 4 is a vertical cross sectional side view which shows another embodiment of a temperature sensitive fan coupling apparatus in accordance with the invention.

Further, FIG. 4 shows an embodiment in which the spiral bimetal 9-2 is used for the temperature sensitive body as an actuator and the invention is applied to the fan coupling apparatus structured such as to be opened and closed by slidably displacing the supply hole 10-2 to the side of the torque transmission chamber 3 provided on the peripheral side wall surface within the cover 2-2 in a peripheral direction. In this case, a mechanism is structured such that interlocking with the displacement due to the temperature change of the spiral bimetal 9-2, the valve member 7-2 opens and closes the supply hole 10-2 provided on the peripheral side wall surface within the cover 2-2. That is, in accordance with the displacement of the spiral bimetal 9-2, in the case that the ambient temperature is high, the valve member 7-2 is rotated via the connecting rod 8-2, whereby the supply hole 10-2 is opened and the oil within the oil reserving chamber 5 is supplied to the torque transmission chamber 3, and on the contrary, in the case that the ambient temperature is low, the valve member 7-2 is inversely rotated via the connecting rod 8-2, whereby the supply hole 10-2 is closed and the supply of the oil to the torque transmission chamber 3 is stopped.

Figure 6A:
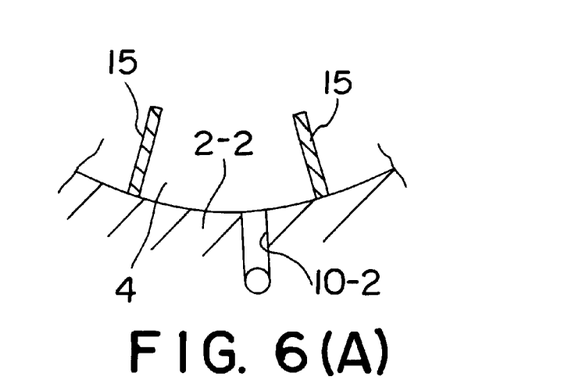
FIG. 6A is a vertical cross sectional front view showing barrages formed in a tapered shape and FIG. 6B is a vertical cross sectional front view showing barrages integrally formed with a cover.
Figure 6B:
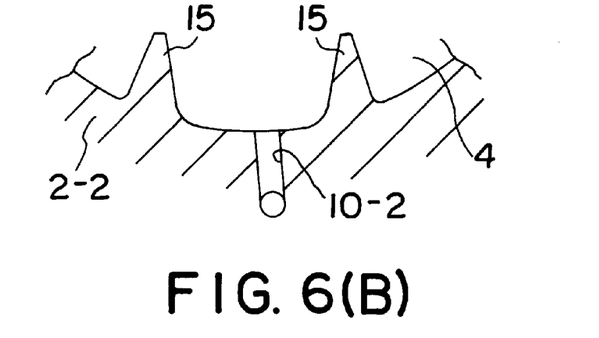

In the case of the fan coupling apparatus as shown in FIG. 4 mentioned above, the barrages 15 being the same as those mentioned above are provided in the diametrical direction in both sides of the supply hole 10-2 provided on the inner peripheral wall of the cover 2-2 and at a position of the peripheral direction of the rotary shaft body 1 in such a manner as to be closely attached to both of the inner peripheral wall of the oil reserving chamber 5 and the partition plate 4, preferably in such a manner as to be integrally formed with the inner peripheral wall. The barrages 15 may be provided in a tapered shape manner as shown in FIG. 6 (refer to FIG. 6A), and may be integrally formed with the cover (refer to FIG. 6B). Also in the case that a pair of barrages 15 are provided in both side of the supply hole 10-2 provided on the inner peripheral wall of the cover 2-2 as mentioned above, the barrages flow a necessary amount of oil within the oil reserving chamber 5 to a portion near the supply hole 10-2 in the same manner as mentioned above and store the oil except that in the oil reserving chamber 5, whereby the oil which is necessary for securing a durability of the oil and absorbing the error on manufacture, however, excessive with respect to the countermeasure for the "accompanying rotation" can be held within the oil reserving chamber 5 not in the space portion 3-2 in front of the torque transmission gap portion 3-1 within the torque transmission chamber 3, so that it is possible to prevent the "accompanying rotation" phenomenon in the side of the sealing device box 2 due to the excessive oil.

Figure 5:
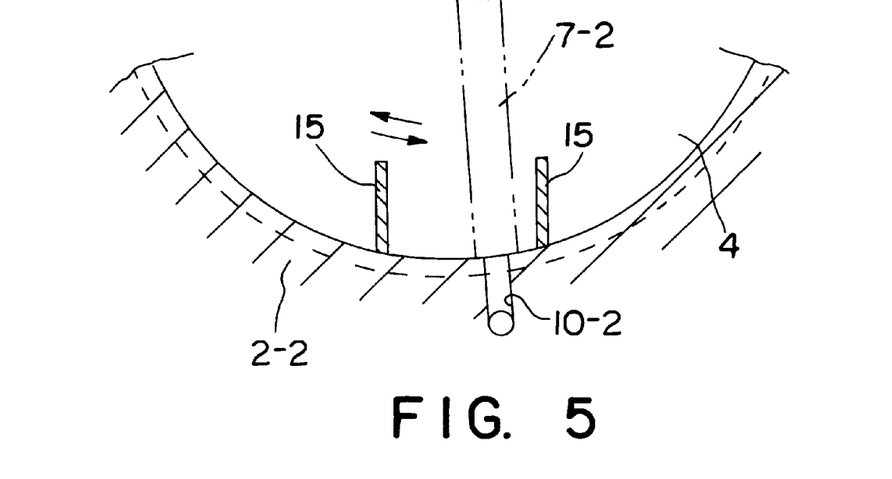
FIG. 5 is a vertical cross sectional front view which shows a portion of barrages provided in an oil reserving chamber of the fan coupling apparatus mentioned above.
Figure 7:
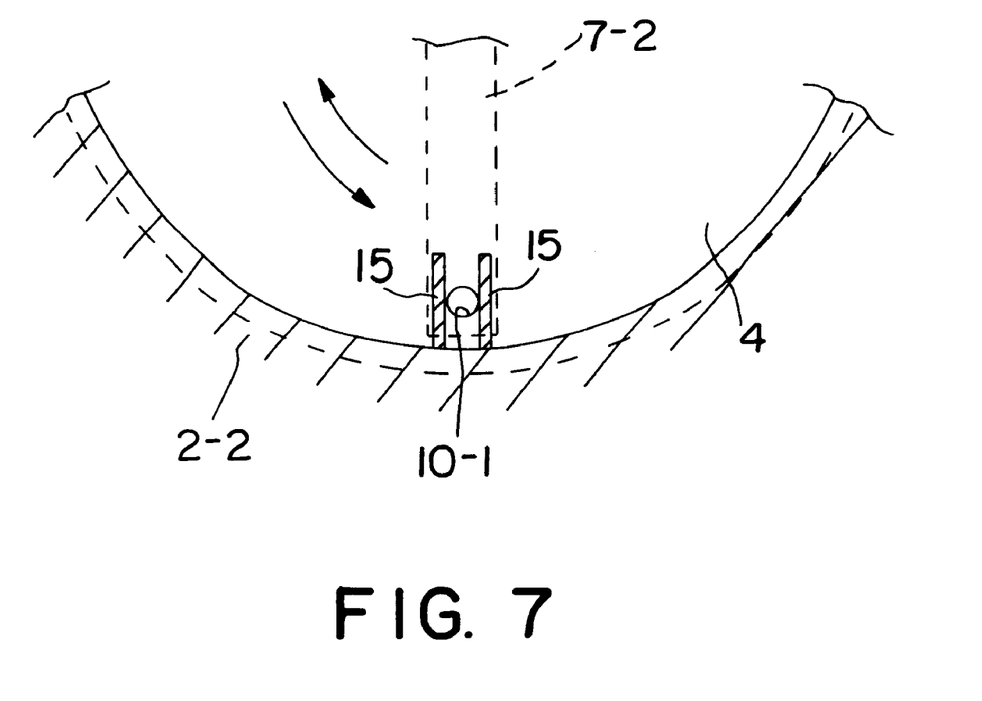
FIG. 7 is a vertical cross sectional front view which shows barrages provided in a torque transmission chamber of the fan coupling apparatus mentioned above.

In the fan coupling apparatus using the spiral bimetal shown in FIGS. 4 to 6 mentioned above, the structure is made such that the valve member 7-2 slides and displaces the supply hole 10-2 to the side of the torque transmission chamber 3 provided on the peripheral side wall surface within the cover 2-2 in the peripheral direction so as to open and close the supply hole 10-2, however the structure may be made such that the valve member 7-2 slides and displaces the surface in the side of the oil reserving chamber of the partition plate 4 in the peripheral direction so as to open and close the supply hole 10-1 provided in the partition plate 4 (not shown), or such that the valve member 7-2 slides and displaces the surface in the side of the torque transmission chamber 3 of the partition plate 4 in the peripheral direction as shown in FIG. 7 so as to open and close the supply hole 10-2 provided in the partition plate 4. When the structure is made in this manner, an interval between a pair of barrages 15 can be made as small as a diameter of the supply hole 10-1 since the valve member 7-2 is not brought into contact with a pair of barrages 15 even when the valve member 7-2 slides and displaces in the peripheral direction.

Figure 8:
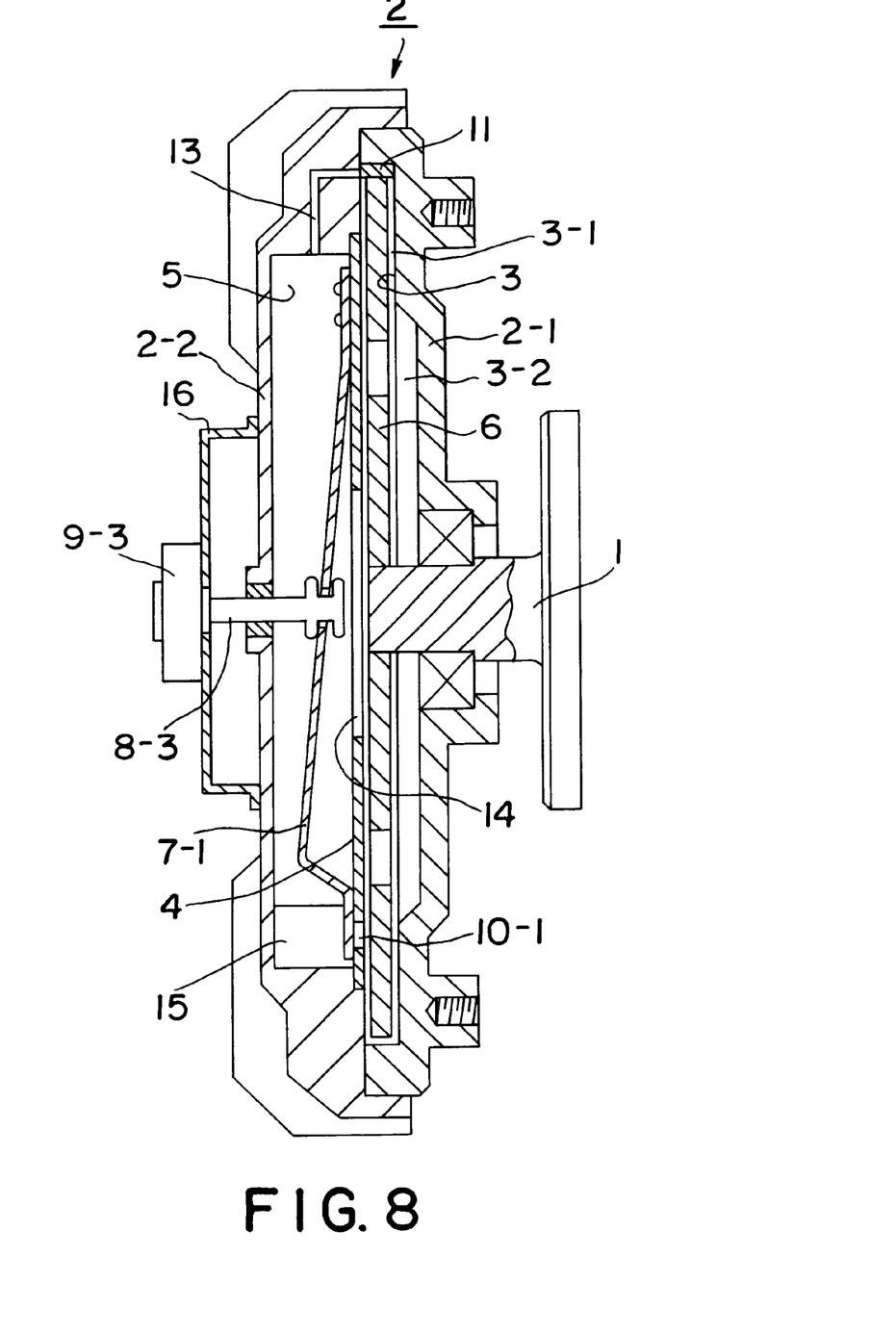
FIG. 8 is a vertical cross sectional side view which shows the other embodiment of a temperature sensitive fan coupling apparatus in accordance with the invention.

Further, FIG. 8 shows an embodiment in which the solenoid valve 9-3 supported to the support metal fitting 16 fixed to the front surface of the cover 2-2 is used as an actuator and the invention is applied to the fan coupling apparatus structures such as to open and close the supply hole 10-1 to the side of the torque transmission chamber 3 provided in the partition plate 4 by connecting and disconnecting the plate-like valve member 7-1 in the same manner as the embodiment shown in FIG. 1. In this case, the solenoid valve 9-3 is set to an operating state or a non-operating state on the basis of an output signal of a temperature sensor (not shown) for detecting a temperature change of an outer periphery or a throttle opening degree sensor (not shown) for detecting a throttle opening degree, thereby protruding or retracting the piston rod 8-3. Due to the protrusion and retraction of the piston rod 8-3, the valve member 7-1 mounted to the free end of the piston rod 8-3 opens and closes the supply hole 10-1 provided in the partition plate 4. That is, in the case that the ambient temperature detected by the temperature sensor is high or the change of the throttle opening degree per a unit time detected by the throttle opening degree sensor is small, the solenoid valve 9-3 becomes in a non-operating state on the basis of the output signal of the sensor so as to retract the piston rod 8-3, so that the valve member 7-1 is apart from the supply hole 10-1 so as to open the supply hole 10-1 and the oil within the oil reserving chamber 5 is supplied to the torque transmission chamber 3. On the contrary, in the case that the ambient temperature detected by the temperature sensor is low or the throttle opening degree per a unit time detected by the throttle opening degree sensor is rapid, the solenoid valve 9-3 is operated on the basis of the output signal of the sensor so as to protrude the piston rod 8-3, so that the valve member 7-1 approaches the supply hole 10-1 so as to close the supply hole 10-1 and the supply of the oil to the torque transmission chamber 3 is stopped.

Also in the case shown in FIG. 8, when a pair of barrages 15 are provided in the diametrical direction in both sides of the supply hole 10-1 provided in the partition plate 4 and at a position of the peripheral direction of the rotary shaft body 1 in such a manner as to be closely attached to both of the inner peripheral wall of the oil reserving chamber 5 and the partition plate 4, the barrages 15 serve to flow a necessary amount of oil within the oil reserving chamber 5 to a portion near the supply hole 10-1 and store the oil except that in the oil reserving chamber 5, whereby the oil which is necessary for securing a durability of the oil and absorbing an error on manufacture, however, excessive with respect to the countermeasure for the "accompanying rotation" can be held within the oil reserving chamber 5 not in the space portion 3-2 in front of the torque transmission gap portion 3-1 within the torque transmission chamber 3, so that it is possible to prevent the "accompanying rotation" phenomenon in the side of the sealing device box 2 due to the excessive oil.

Figure 9:
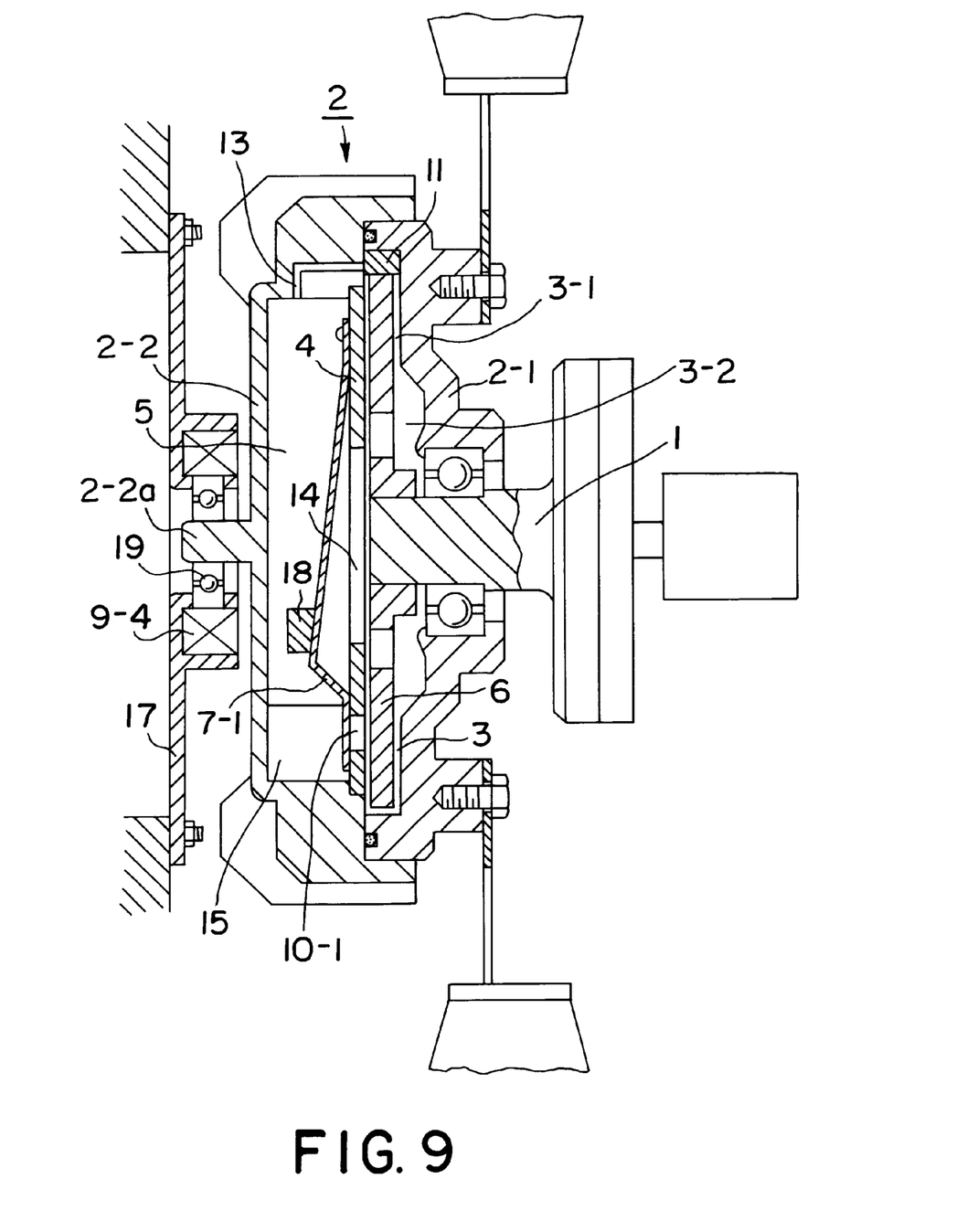
FIG. 9 is a vertical cross sectional side view which shows further the other embodiment of a temperature sensitive fan coupling apparatus in accordance with the invention.

Further, FIG. 9 shows an embodiment in which the invention is applied to the fan coupling apparatus structured such as to use the electromagnet 9-4 provided on the front surface of the cover 2-2 at a slight interval in an axial direction as an actuator and adhered to the bracket 17 mounted to a base body such as a vehicle body in a coaxial ring manner, mount the magnetic body piece 18 to a position corresponding to the electromagnet 9-4 of the plate-like valve member 7-1 having a spring characteristic being the same as that of the embodiment shown in FIG. 1 and open and close the supply hole 10-1 communicating with the side of the torque transmission chamber 3 provided in the partition plate 4 by connecting and disconnecting the plate-like valve member 7-1. In this case, the temperature change in the outer periphery is detected by a temperature sensor (not shown) or a throttle opening degree sensor (not shown) for detecting the throttle opening degree, and the electromagnet 9-4 is energized or cancelled on the basis of the output signal of the sensor so as to suck the valve member 7-1 or cancel the suction, whereby the valve member 7-1 opens or closes the supply hole 10-1 provided in the partition plate 4. That is, in the case that the ambient temperature sensed by the temperature sensor is high or the change of the throttle opening degree per a unit time detected by the throttle opening degree sensor is small, the electromagnet 9-4 is energized on the basis of the output signal of the sensor, the magnetic body piece 18 of the valve member 7-1 is magnetically sucked, the valve member 7-1 moves apart against the spring force of the valve member 7-1 itself so as to open the supply hole 10-1, and the oil within the oil reserving chamber 5 is supplied to the torque transmission chamber 3. On the contrary, in the case that the ambient temperature detected by the temperature sensor is low or the throttle opening degree per a unit time detected by the throttle opening degree is rapid, the electromagnet 9-4 is cancelled on the basis of the output signal of the sensor so as to cancel the magnetic suction against the magnetic body piece 18 of the valve member 7-1, the valve member 7-1 comes near due to the spring force of the valve member 7-1 so as to close the supply hole 10-1, and the supply of the oil to the torque transmission chamber 3 is stopped.

In this case, in the embodiment shown in FIG. 9, the center portion of the bracket 17 to which the ring-like electromagnet 9-4 is adhered is mounted to the support shaft 2-2a protruded from the center of the outer portion of the cover 2-2 via the bearing 19 and both end portions are fixed to the base body such as the vehicle body, however, the invention is not limited to this kind of embodiment.

Also in the case of FIG. 9 mentioned above, when a pair of barrages 15 are provided in the diametrical direction in both sides of the supply hole 10-1 provided in the partition plate 4 and at a position of the peripheral direction of the rotary shaft body 1 in such a manner as to be closely attached to both of the inner peripheral wall of the oil reserving chamber 5 and the partition plate 4, the barrages serve to flow a necessary amount of oil within the oil reserving chamber 5 to the portion near the supply hole 10-1 and store the oil except that in the oil reserving chamber 5, whereby the oil which is necessary for securing a durability of the oil and absorbing an error on manufacture, however, excessive with respect to the countermeasure for the "accompanying rotation" can be held within the oil reserving chamber 5 not in the space portion 3-2 in front of the torque transmission gap portion 3-1 within the torque transmission chamber 3, so that it is possible to prevent the "accompanying rotation" phenomenon in the side of the sealing device box 2 due to the excessive oil.

Figure 10A:
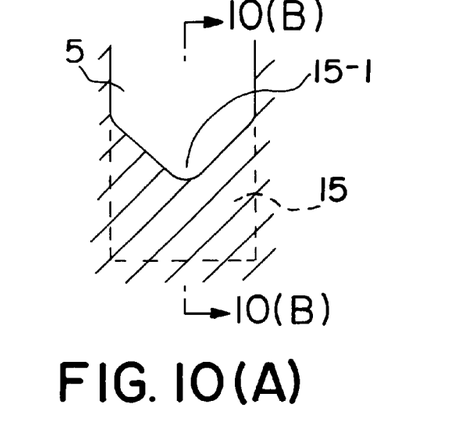
FIG. 10A is an enlarged vertical cross sectional view and FIG. 10B is a cross sectional view on a line 10B—10B in FIG. 10A.
Figure 10B:
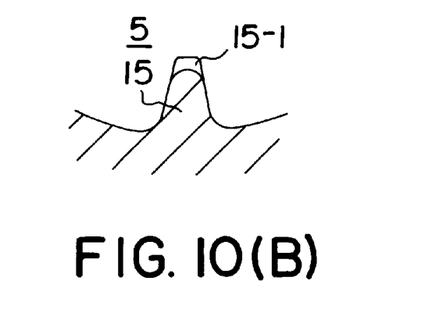
Figure 11A:
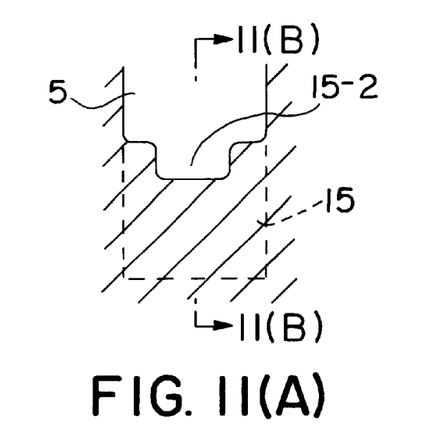
FIG. 11A is an enlarged vertical cross sectional view and FIG. 11B is a cross sectional view on a line 11B—11B in FIG. 1A.
Figure 11B:
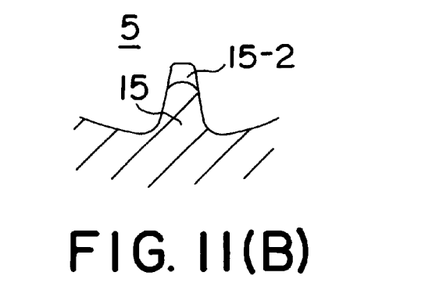
Figure 12A:
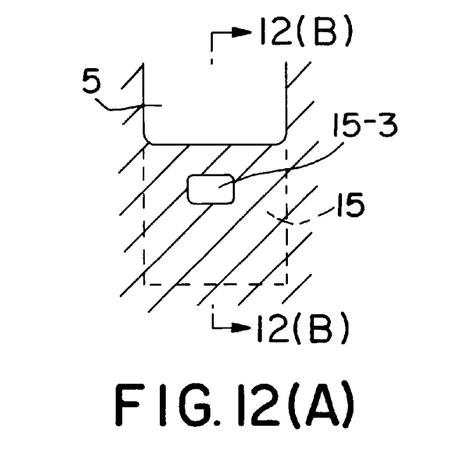
FIG. 12A is an enlarged vertical cross sectional view and FIG. 12B is a cross sectional view on a line 12B—12B in FIG. 12A.
Figure 12B:
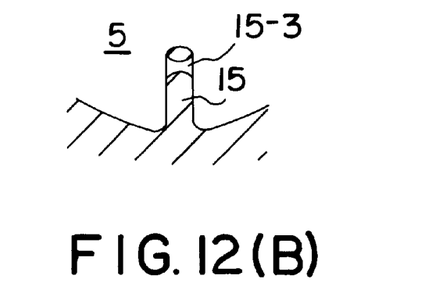

In each of the embodiments mentioned above, the description is given of the embodiment structured such that the inner free ends of the barrages 15 are aligned on the same surface in an axial direction, however, the invention is not limited to this kind of embodiment, and it is preferable to form the inner free ends of the barrages 15 in a shape shown in FIGS. 10 to 12 so as to form as inlet restriction means for an excessive oil which can flow the oil overflowing from the barrages 15 at a time of restarting the engine or rapidly accelerating during an operation as little ass possible and slowly.

Figure 13A:
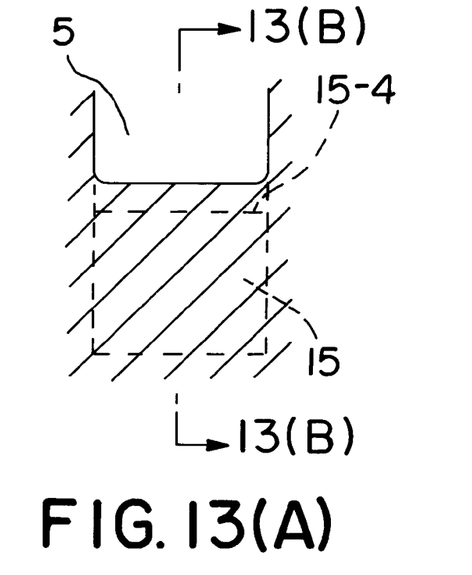
FIG. 13A is an enlarged vertical cross sectional view and FIG. 13B is a cross sectional view on a line 13B—13B in FIG. 13A.
Figure 13B:
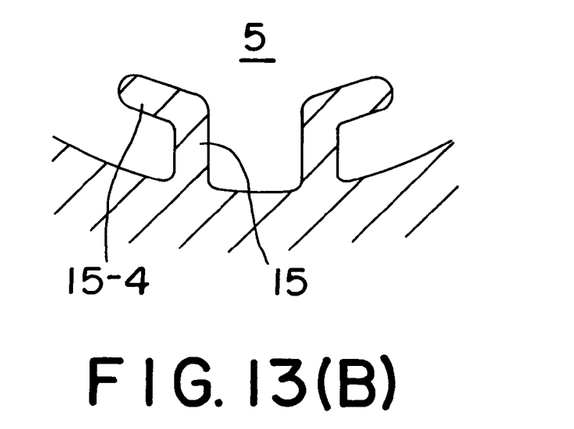
Figure 14A:
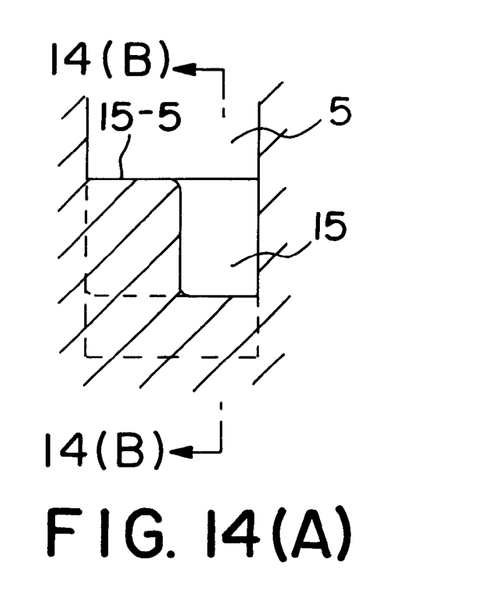
FIG. 14A is an enlarged vertical cross sectional view and FIG. 14B is a cross sectional view on a line 14B—14B in FIG. 14A.
Figure 14B:
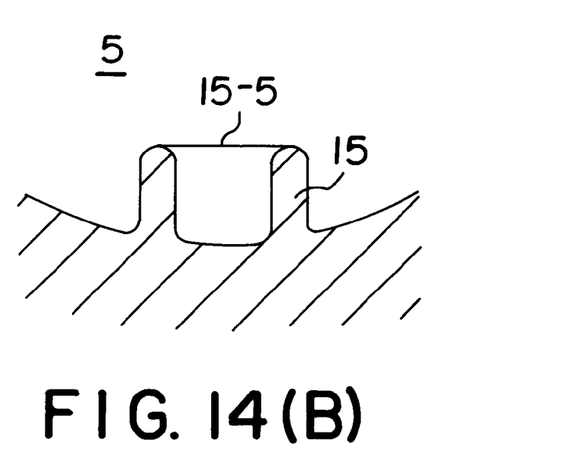

That is, the inner free ends of the barrages 15 are provided with a substantially V-shaped or substantially U-shaped notch 15-1 as shown in FIG. 10, a rectangular notch 15-2 at a substantially center portion as shown in FIG. 11, an oval-shaped orifice 15-3 near the inner free end as shown in FIG. 12, a wall portion 15-4 extending in a peripheral direction as shown in FIG. 13 or a step portion 15-5 as shown in FIG. 14.

As mentioned above, since the oil in the torque transmission gap portion 3-1 is recovered by the dam 11 so as to flow into the oil reserving chamber 5 at a time of restarting the engine or rapidly accelerating during the operation, and no oil exists in the space portion 3-2 in front of the torque transmission gap portion 3-1, the "accompanying rotation" phenomenon is not generated in the side of the sealing device box 2. However, in the case that the oil flowing into the oil reserving chamber 5 is rapid and a large amount, it immediately overflows the barrages 15, reaches the supply hole 10-1 and flows into the torque transmission chamber 3, and next enters into the torque transmission gap portion 3-1 so as to transmit the torque, so that there is a possibility of shortening the period for preventing the "accompanying rotation" phenomenon in the side of the sealing device box 2. In this case, the notch 15-1 or 15-2 or the oval orifice 15-3 is provided in the inner free end of the barrages 15 as shown in FIGS. 10 to 12, the wall portion 15-4 extending in the peripheral direction is provided in opposing direction of the inner end portion of a pair of barrages 15 as shown in FIG. 13, or the step portion 15-5 extending from the side of the cover 2-2 is provided between a pair of barrages 15 as shown in FIG. 14. By employing the structure mentioned above, the oil recovered in the oil reserving chamber 5 can reach the supply hole 10-1 only after passing through the notch 15-1 or 15-2 ore the oval orifice 15-3, or can reach the supply hole 10-1 only after overriding the wall portion 15-4 or the step portion 15-5. Accordingly, since a lot of time is required for this passing or the overriding and an amount thereof is a little, the inlet of the oil to the torque transmission gap portion 3-1 is delayed and an amount of the oil is a little, so that it is possible to further effectively prevent the "accompanying rotation" phenomenon.

In this case, when forming the surface of the wall portion 15-4 shown in FIG. 13 or the surface of the step portion 15-5 shown in FIG. 14 in a rough surface or an uneven surface, or forming the step portion 15-5 shown in FIG. 14 in an inclined surface being higher in the side of the torque transmission chamber 5 than in the side of the cover 2-2, an arrival of the oil to the supply hole 10-1 is further delayed, so that it is possible to more effectively prevent the "accompanying rotation" phenomenon.

As mentioned above, since the temperature sensitive fan coupling in accordance with the invention can hold the oil which is necessary for securing a durability of the oil and absorbing an error on manufacture, however, excessive with respect to the countermeasure for the "accompanying rotation" in the oil reserving chamber not in the space portion in front of the torque transmission gap portion within the torque transmission chamber on the sake of the operation of a pair of barrages provided in the oil reserving chamber, it is possible to prevent the "accompanying rotation" phenomenon in the side of the sealing device box (a cooling fan) due to the excessive oil. Therefore, in accordance with the invention, it is possible to prevent the "accompanying rotation" phenomenon in the side of the sealing device box not only at a time of restarting the engine but also at a time of rapidly accelerating during the operation, so that there can be achieved an excellent effect that it is possible to transmit the torque from the drive disc to the sealing device box at an optimum state in correspondence to the various kinds of drive conditions by the valve member operating in response to the change of the ambient temperature as well as a reduction of the cooling fan sound, a reduction of the fan absorption horse power and an improvement of the specific fuel consumption can be achieved. Further, there can be also obtained an effect that the oil heated by being sheared by the drive disc in the torque transmission chamber stays in the oil reserving chamber for a long time, whereby the oil is further cooled, so that a durability of the oil can be improved.

What is claimed is:

1. A temperature sensitive fluid fan coupling apparatus comprising:
    a rotary shaft having a rotational axis;
    a drive disc fixed to said rotary shaft being and rotatable therewith, the drive disc having an outer periphery;
    a box having an inner portion, said box being rotatably mounted on the rotary shaft such that the drive disc is within the inner portion of the box;
    a partition plate secured in the box and separating the inner portion of the box into an oil reserving chamber and a torque transmission chamber, such that the drive disc is disposed in the torque transmission chamber;
    a dam formed on the box at a location in the torque transmission chamber opposed to the outer periphery of the drive disc;
    an oil circulating flow passage extending from a location in the torque transmission chamber adjacent the dam to a location in the oil reserving chamber;
    an oil supply hole formed through the partition plate at a location in proximity to the outer periphery and extending from the oil reserving chamber to the torque transmission chamber;
    a valve member in the oil reserving chamber for selectively opening and closing the supply hole;
    an actuator extending from a location externally of said box into the oil reserving chamber, the actuator cooperating with the valve for selectively opening and closing the supply hole; and
    a pair of barrages extending from the partition plate on opposite respective sides of the supply hole to portions of the box that are opposite the partition plate in the oil reserving chamber.

2. A temperature sensitive fluid fan coupling apparatus as claimed in claim 1, wherein said box comprises a cover and a casing assembled around the partition plate such that the oil reserving chamber is defined by said partition plate and a portion of said cover, said barrages being integrally formed with the cover and extending into contact with the partition plate.

3. A temperature sensitive fluid fan coupling apparatus as claimed in claim 1, wherein said barrages are substantially parallel to one other.

4. A temperature sensitive fluid fan coupling apparatus as claimed in claim 1, wherein said barrages are aligned in substantially radial directions relative to the rotary shaft.

5. A temperature sensitive fluid fan coupling apparatus as claimed in claim 4, wherein said barrages are tapered from a substantially narrow width at locations closer to the rotational axis of said rotary shaft to a wider width at locations further from the rotational axis.

6. A temperature sensitive fluid fan coupling apparatus as claimed in claim 1, wherein said valve includes a fixed end and a free end, said free end being selectively movable into at least partly covering relationship to the supply hole, the free end of the valve being disposed between the barrages.

7. A temperature sensitive fluid fan coupling apparatus as claimed in claim 6, wherein the fixed end of the valve is secured to the partition plate at a location substantially diametrically opposite said supply hole.

8. A temperature sensitive fluid fan coupling apparatus as claimed in claim 7, wherein said actuator comprises a bimetal disposed at an external position on said box, and a piston extending from the bimetal into the oil reserving chamber such that a free end of the piston engages a portion of said valve between said fixed and free ends, whereby deflection the bimetal causes a movement a piston and a corresponding movement of the valve.

9. A temperature sensitive fluid fan coupling apparatus as claimed in claim 8, wherein said bimetal is a short strip.

10. A temperature sensitive fluid fan coupling apparatus as claimed in claim 8, wherein said bimetal is formed in the shape of a spiral.

11. A temperature sensitive fluid fan coupling apparatus as claimed in claim 1, wherein the actuator is a solenoid valve.

12. A temperature sensitive fluid fan coupling apparatus as claimed in claim 1, wherein said actuator comprises an electromagnet.

13. A temperature sensitive fluid fan coupling apparatus as claimed in claim 1, further comprising restriction means opposite said barrages for controlling oil flow to said supply hole.

14. A temperature sensitive fluid fan coupling apparatus as claimed in claim 13, wherein said restriction means comprises a notch provided at a radially inner portion of at least one of said barrages.

15. A temperature sensitive fluid fan coupling apparatus as claimed in claim 13, wherein at least one of said barrages is provided with an orifice extending entirely therethrough.

* * * * *